(12) United States Patent
Loring et al.

(10) Patent No.: US 7,244,000 B2
(45) Date of Patent: Jul. 17, 2007

(54) BY WIRE CONTROL OF BRAKING AND ACCELERATION

(75) Inventors: Peter Alexander Loring, Robbinsdale, MN (US); Steven Vincent Feeny, Plymouth, MN (US); Robert J. Erko, Apple Valley, MN (US); Paul Groschen, White Bear Lake, MN (US); Richard Milun, Corchran, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 11/073,785

(22) Filed: Mar. 7, 2005

(65) Prior Publication Data

US 2005/0194837 A1   Sep. 8, 2005

Related U.S. Application Data

(60) Provisional application No. 60/550,885, filed on Mar. 5, 2004.

(51) Int. Cl.
*B60T 13/00* (2006.01)
(52) U.S. Cl. .......................... 303/20; 303/151; 303/152
(58) Field of Classification Search ................ 303/20, 303/152, 112, 199; 701/70, 71
See application file for complete search history.

(56) References Cited

U.S. PATENT DOCUMENTS 5,977,740 A * 11/1999 McCann ...................... 318/701
6,425,643 B2 * 7/2002 Shirai et al. ................. 303/112

* cited by examiner

*Primary Examiner*—James McClellan
*Assistant Examiner*—Vu Q. Nguyen
(74) *Attorney, Agent, or Firm*—Altera Law Group, LLC

(57) ABSTRACT

A rider surface maintenance vehicle with variable dynamic braking, in contrast to a mechanically-engaged braking system that uses a brake cable. A brake pedal engages a sensor that encodes the pedal position as an electronic signal. The electronic signal, along with the vehicle velocity, determines a machine deceleration rate, or braking rate, either by calculation, lookup table, or a combination of the two. The braking rate may be tuned so that the of the brake mimics or approximates the feel of a conventional mechanically-engaged brake that uses a brake cable. During stopping, once the vehicle passes below a threshold velocity, a parking brake is automatically engaged. The braking rate is converted to a duty cycle, and the braking is preferably accomplished by pulse width modulation (PWM) of an electrical load applied in parallel to the motor.

13 Claims, 4 Drawing Sheets

BY WIRE CONTROL OF BRAKING AND ACCELERATION

CROSS-REFERENCE TO RELATED APPLICATIONS

This application claims the benefit of U.S. Provisional Application No. 60/550,885, filed Mar. 5, 2004.

STATEMENT REGARDING FEDERALLY SPONSORED RESEARCH OR DEVELOPMENT

Not Applicable

BACKGROUND OF THE INVENTION

1. Field of the Invention

The present invention is directed to surface cleaning equipment, and more particularly to a braking mechanism for surface cleaning equipment.

2. Background

Surface maintenance vehicles and cleaning devices have a long history subject to gradual innovation and improvement toward improved and oftentimes automated performance in removing debris and contamination from floors. These vehicles and devices may be self-powered, towed, or pushed, and/or manually powered and may carry a human operator during cleaning operations. Such vehicles and devices include scrubbers, extractors, sweepers and vacuums, as well as combinations thereof, intended for cleaning, scrubbing, wiping and/or drying a portion of a substantially flat surface both indoors and outdoors.

A class of surface maintenance vehicles, known as riders, may contain an operator that drives the vehicle, using controls functionally similar to those in an automobile, including a steering wheel, an accelerator pedal and a brake pedal. As in an automobile, the accelerator and brake speed up and slow down the vehicle, but because the motor in a rider vehicle is typically electric, the methods by which the accelerator and brake function are usually quite different from those in an automobile.

The braking on a typical rider surface maintenance vehicle is generally accomplished in a mechanical manner, using a brake cable to transmit a force from the brake pedal to one or more brake pads. Although a mechanical brake assembly provides the operator with a comfortable "feel" for braking, it is relatively expensive. A significant cost savings would be realized if the mechanical braking assembly were eliminated. Note that for safety concerns, it is not feasible to eliminate the brake pedal on a rider surface maintenance vehicle. (In contrast, a walk-behind machine may function without an additional brake, because the speeds are much less and the machines may be much smaller.)

For safety reasons, a rider surface maintenance vehicle usually has a mechanical brake, typically in the form of a spring-loaded caliper brake pad, which is often referred to as a parking brake, which may or may not share a mechanism with the mechanical brake described above. Generally, the parking brake may be activated electronically by a solenoid, so that if the current to the solenoid is shut off, as may occur during a failure mechanism, then the parking brake is engaged. The use of a solenoid-activated spring-loaded caliper brake as a parking brake is well-known in the art. In addition, it is common to engage the parking brake when the accelerator pedal is released, when the vehicle velocity drops below a threshold value.

Accordingly, there exists a need for a braking mechanism that costs less than a mechanical assembly, but still provides the operator with a proper braking "feel", and stops the vehicle in the event of a malfunction. Thus, since most operators are already familiar with the feel of a mechanical braking system, designing an electrical system which proximates (mimics) that feel is highly desirable.

BRIEF SUMMARY OF THE INVENTION

An embodiment is a method of providing an electrical braking function through an electrical motor in a surface maintenance vehicle to mimic the function of a mechanical braking system, comprising the steps of: engaging a brake pedal to initiate braking function; sensing the position of the brake pedal and encoding the pedal position as an electronic signal; sensing the vehicle velocity; using said vehicle velocity and said signal, determining a desired machine deceleration rate to approximate the sensation of mechanical braking; determining the desired conductance applied in parallel to the motor to create a dynamic braking force from the motor; and re-adjusting the conductance in response to deceleration to mimic the feel of mechanical braking, whereby the vehicle is decelerated.

A further embodiment is a method of providing an electrical braking function through an electrical motor in a surface maintenance vehicle to mimic the function of a mechanical braking system, comprising the steps of: engaging a brake pedal to initiate braking function; sensing the position of the brake pedal and encoding the pedal position as an electronic signal; sensing the vehicle velocity; using said vehicle velocity and said signal, determining a desired machine deceleration rate to approximate the sensation of mechanical braking; generating a series of pulses of frequency greater than the response frequency of the motor; within each pulse defining the desired duty cycle to create an effective conductance; applying the effective conductance in parallel with the motor to cause machine deceleration by dynamic braking; and iteratively checking vehicle velocity and brake pedal position and correspondingly altering duty cycle to respond to demand for greater or lesser braking.

A further embodiment is a method of providing an electrical braking function through an electrical motor in a surface maintenance vehicle to mimic the function of a mechanical braking system, comprising the steps of: engaging a brake pedal to initiate braking function; sensing the position of the brake pedal and encoding the pedal position as an electronic signal; sensing the vehicle velocity; using said vehicle velocity and said signal, determining a desired machine deceleration rate to approximate the sensation of mechanical braking; generating an analog signal in response to the deceleration rate; applying a voltage in response to the analog signal to the motor to cause machine deceleration by dynamic braking; and iteratively checking vehicle velocity and brake pedal position and correspondingly altering the voltage to respond to demand for greater or lesser braking.

A further embodiment is an electrically powered surface maintenance machine with dynamic braking capable of mimicking mechanical braking, comprising: an electric motor; a brake pedal having a position sensor; an encoder for converting the pedal position to an electrical pedal position signal; a machine velocity sensor; a braking rate controller capable of determining braking force tuned to approximate mechanical braking, in response to the electrical pedal position signal and the machine velocity; a converter to translate braking rate to an effective electrical load to be applied in parallel to the motor; an updater for iteratively checking the machine velocity and the pedal position and repeatedly adjusting the braking rate and thereby adjusting the effective electrical load applied in parallel to the motor.

DETAILED DESCRIPTION OF THE INVENTION

Figure 1:
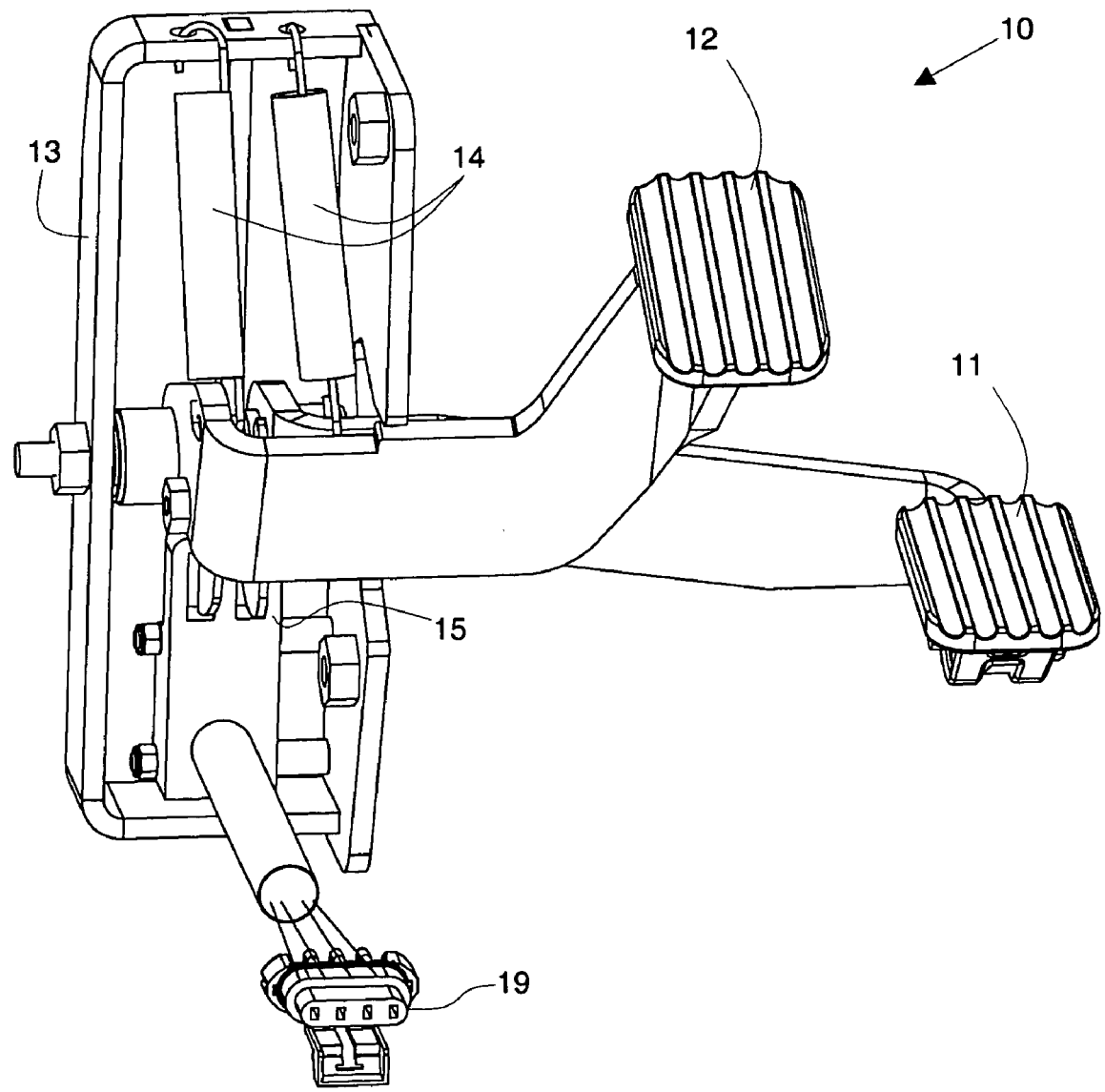
FIG. 1 is a front view drawing of a pedal assembly.

In the present invention an accelerator pedal (thought not limited to a pedal, such as a joystick or other responsive device) is employed to initiate for movement. The user depresses the accelerator by a physical amount, say 20%. The physical depression is converted into an electrical signal by a sensor, typically a Hall effect sensor, which is well-known in the art. An electrical signal representing 20% is sent to a controller circuit, which adjusts a voltage sent to the motor by the method of pulse-width-modulation (PWM). In PWM, a voltage is sent in the form of pulses, with a frequency generally higher than the motor can respond, say at 2 KHz. Every 0.5 msec, a generally rectangular pulse is sent, with a low voltage (usually 0 volts) for a fraction of the pulse, then a high voltage (usually the battery voltage, say 24 volts) making up the rest of the pulse. The relative lengths of the low and high-voltage portions are expressed as a duty cycle. For instance, a pulse having a duty cycle of 20%, corresponding to our earlier example, would have a portion of 0 volts for 0.1 msec, followed by a portion of 24 volts for 0.4 msec. The controller circuit controls the duty cycle of the pulses in response to the physical depression of the accelerator pedal, from roughly 0% to roughly 100%. A physical depression of 0% would send effectively 0 volts to the motor. A physical depression of 100% would send the motor the maximum voltage, or 24 volts in our example. A physical depression of 50% would send the motor pulses made up of 0 volts for half the pulse length, then 24 volts for half the pulse length. Note that the relationship between physical depression and duty cycle may be more complicated that the one-to-one correspondence cited in this example. In addition, the high voltage portion may precede the low voltage portion in the pulse. Note that in PWM of voltage, the only discrete voltages present are the high and low voltage levels, and that these two voltage levels drive the motor in a pulsed manner faster than the motor can respond, and that the rotation rate of the motor is determined by the relative lengths in each pulse of the low and high voltage periods or portions.

When the accelerator pedal is released, it is desirable that the vehicle come to deliberate stop (as opposed to coasting to a stop), requiring the use of a braking mechanism. We can achieve braking for an electric motor by applying a load across the motor, often by shorting out the motor. Recall that the required motor power $P=V^2/R$, and if R becomes effectively zero, then the motor would require effectively infinite power to turn, and therefore the motor stops. Simply shorting out the motor when the accelerator pedal is released is not appropriate; the motor and the vehicle would both stop abruptly, and the vehicle operator might suffer injury by colliding with the steering wheel or by being thrown off the vehicle. Using various techniques for varying the resistance/load/conductance across the motor, such as PWM of the load (or resistance) across the motor, where the conductance is kept at low (an open circuit) for a fraction of the pulse, then is raised to a high level (a short circuit) for the remainder of the pulse. In this manner, the vehicle may be stopped in a gradual manner, rather than an abrupt stop. Note that the high level portion may also precede the low level portion of the pulse. This "dynamic" or regenerative braking can be accomplished with PWM or other techniques. Typically, the duty cycle of the braking pulses applied when the accelerator pedal is released is set at the factory, meaning that when the operator releases the accelerator pedal, the vehicle brakes at a preset rate. We call this fixed dynamic braking, meaning that the operator has no control over the rate of the dynamic braking.

Providing a braking system is more problematic since users are so familiar with mechanical systems. Mechanical braking systems have the advantage that the user gets immediate sensation of deceleration in response to increasing pedal pressure. Most electrical braking systems provide no real feedback and the user is likely to "overbrake" based on his/her experience with pedal feedback from mechanical systems. Short of providing a mechanical feedback system in the pedal to simulate pedal resistance in response to greater deceleration, which is incorporated herein as an option, it is still helpful to provide a way to correlate the change in dynamic braking to present velocity, deceleration and pedal position. This is the desired "feel" approximating the mechanical systems described in this application.

Figure 2:
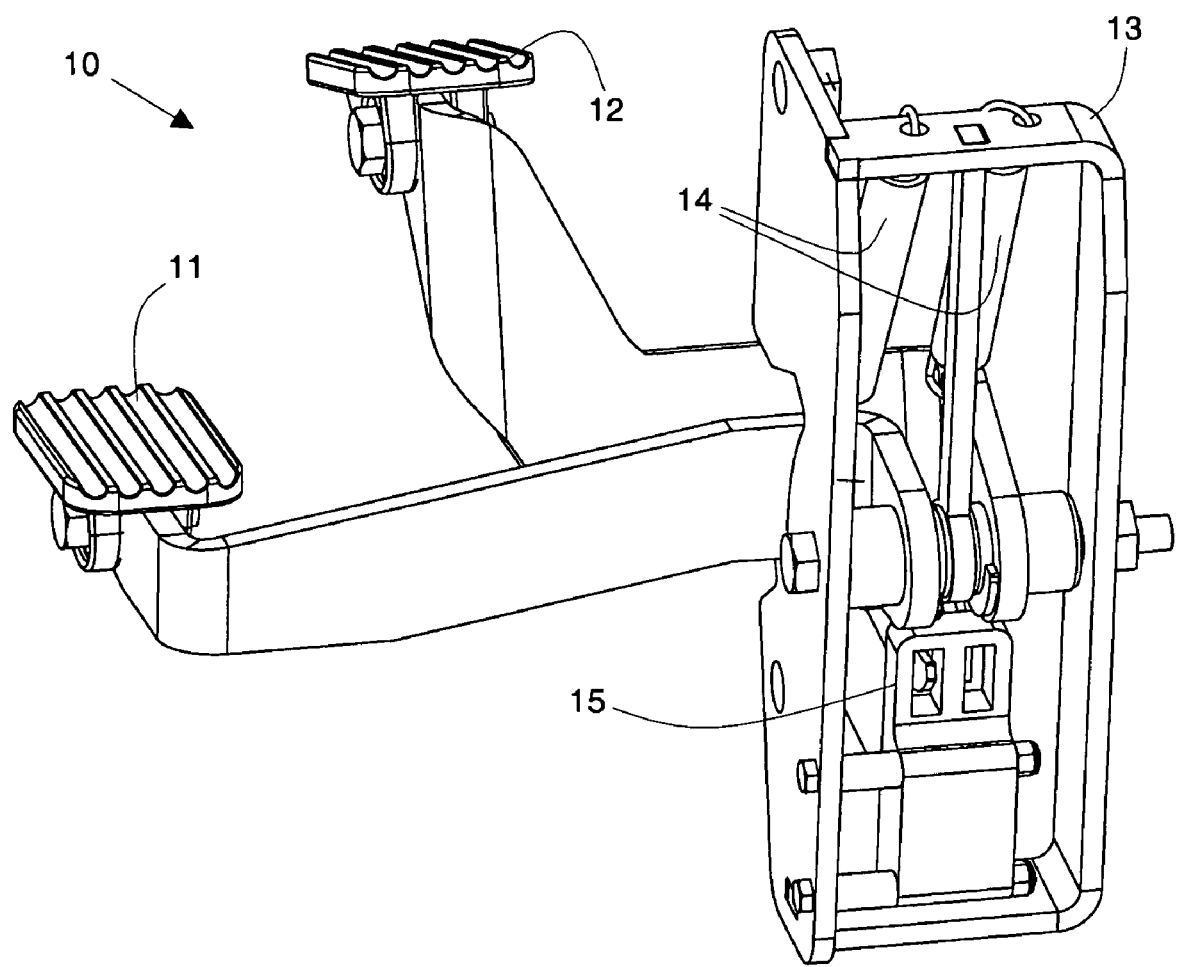
FIG. 2 is a rear view drawing of the pedal assembly of FIG. 1.

FIGS. 1 and 2 show an embodiment of a pedal assembly 10 for a rider surface maintenance vehicle. An accelerator pedal 11 and a brake pedal 12 are each mechanically coupled to a pedal housing 13. (The term "pedal" is not meant to be read as a limitation but can be any human interface device.) A pair of expansion springs 14 provide a resisting force for the pedals 11 and 12, although other types of springs may be used, including compression springs, leaf springs and torsion springs. A pair of sensors 15 converts the mechanical positions of the pedals 11 and 12 into electrical signals, which are delivered to an electrical control system (not pictured) by an electrical interface 19. A suitable sensor 15 may be a Hall effect sensor, for example, although other sensors may be used to convert the mechanical pedal position into an electrical signal. Note that the electrical signals may be analog and continuous in nature, with a property such as voltage, capacitance or resistance varying continuously in response to the pedal position. Alternatively, the electrical signals may be discrete in nature, with a property such as voltage, capacitance or resistance varying stepwise in response to the pedal position. Alternatively, the electrical signals may be a combination of continuous and discrete in nature, in that a property may vary continuously within a particular range, then may jump to another range once a particular threshold is reached. As a further alternative, either or both of the electrical signals may have only one discrete level, meaning that the brake pedal, for instance, may be either "engaged" or "disengaged".

Figure 3:
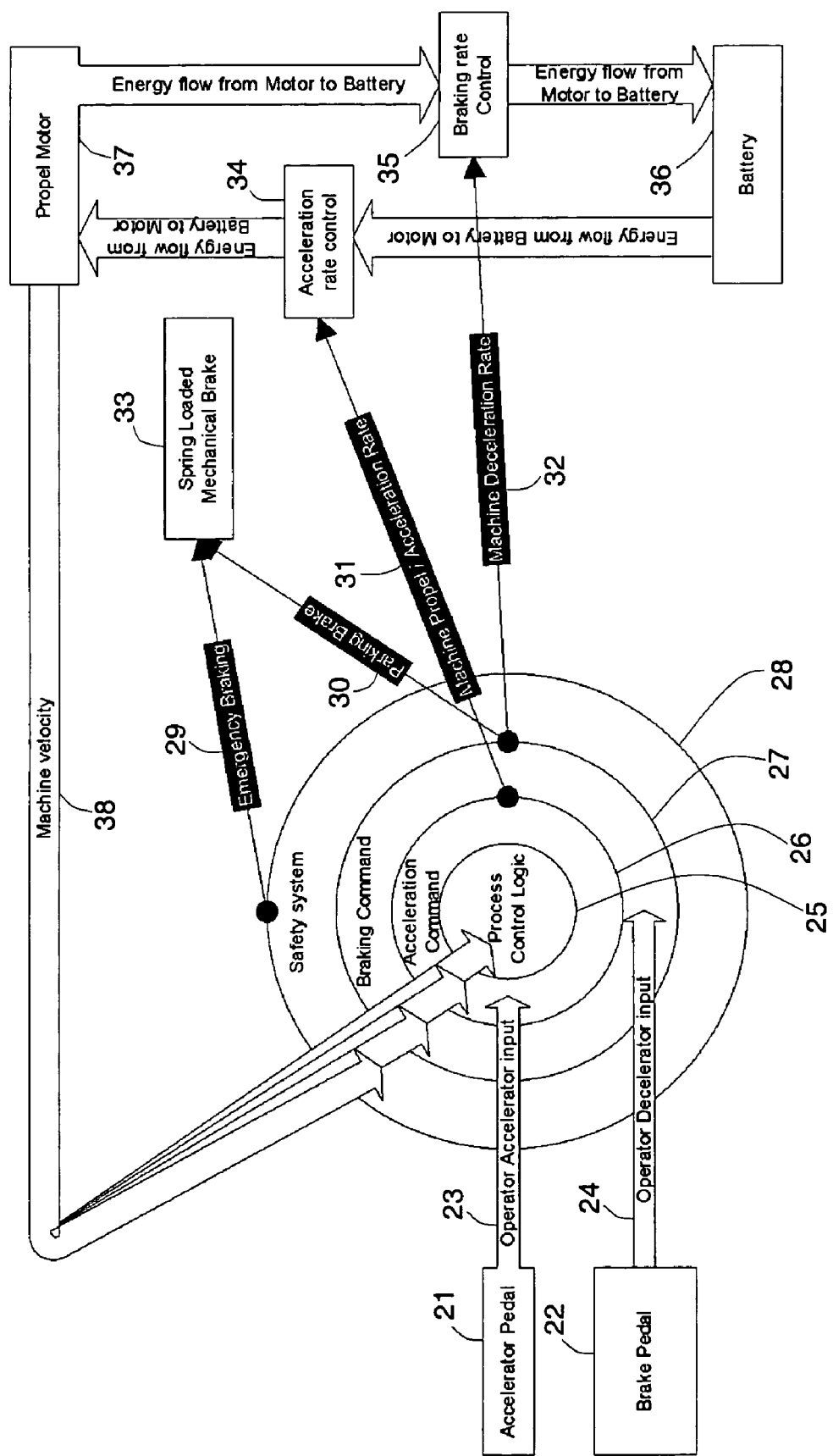
FIG. 3 is an operations chart detailing the braking and acceleration of a rider surface maintenance vehicle.

FIG. 3 shows an exemplary operations chart that provides a relationship among pedal positions, braking, vehicle velocity, and the flow of energy between the battery and the motor. When an operator depresses the accelerator pedal 21 or the brake pedal 22, the pedal positions are converted into electrical signals, which are then input via 23 and 24 to the acceleration and braking command modules 26 and 27, respectively. Those modules are part of a nested system of communication and control, which includes, from most general to most specific, a safety system 28, the braking command 27, the acceleration command 26 and a process control logic 25. All modules 25-28 in the nested system may preferably receive the actual velocity 38 of the vehicle as input.

Based on the operator accelerator input 23 and, optionally, the machine velocity 38, the acceleration command 26 produces an acceleration rate 31 either by dynamic calculation or by a lookup table, or a combination of calculation and lookup table. The acceleration rate 31 is used by the acceleration rate control 34 to propel the motor, denoted by 37 can be selected to give the user the feel of a mechanical braking system.

In order to control the motor speed, and therefore control the velocity of the machine, the rider surface maintenance vehicle may preferably use pulse-width-modulation (PWM) on the voltage applied to the motor, where the pulses are generally applied at a higher frequency than the highest frequency at which the motor can respond (which may be referred to as the response frequency). For use of PWM on the voltage, the acceleration rate 31 is converted to a duty cycle for the pulses. In other words, the accelerator pedal 21 is depressed, the pedal position is converted to an electrical signal, which is passed via 23 to the acceleration command 26, which uses the pedal position and the machine velocity 38 to produce a duty cycle that is used in a PWM of the voltage that is sent to the motor. Thereby, the motor speed is controlled, and the vehicle is propelled. It will be understood that other methods of acceleration rate control 34 other than PWM of the voltage may be used as well, including, but not limited to, pulse position modulation (PPM), in addition to generation of a generally pulse-free analog voltage sent to the motor. For these other methods of acceleration rate control 34, the acceleration rate 31 may be suitably converted to an appropriate quantity.

Based on the operator decelerator, or brake, input 24, and optionally, the machine velocity 38 and/or the operator accelerator input 23, the braking command 27 produces an machine deceleration rate 32, or braking rate, either by dynamic calculation or by a lookup table, or a combination of calculation and lookup table. The deceleration rate may be determined by a braking rate controller. The deceleration rate 32 is used by the braking rate control 35 to slow down the motor, and therefore, slow down the vehicle. The selection of the appropriate rate can provide the user with the feel of a mechanical braking system. Details of the deceleration rate 32 are explained further below.

One possible braking rate control 35 is a PWM of the voltage sent to the motor, except with a reverse polarity. Given a deceleration rate 32, a duty cycle is calculated in the same manner as described above, and a PWM of a reverse-polarity voltage is sent to the motor. This method effectively turns the motor into a generator during the high-voltage reverse-polarity cycles, and recharges the battery 36. Use of a PWM of the voltage with reverse polarity can be called plug braking.

A preferable braking rate control 35 is a PWM of the load or resistance across the motor. The pulses are generated at a frequency higher than the motor can respond, and a value of 2 KHz is typical, although the frequency may also be greater or less than 2 KHz. During a portion of each pulse, a low load (i.e., a low conductance, or, equivalently, a high resistance) is sent to the motor, typically an open circuit. During the remainder of each pulse, a high load (i.e., a high conductance, or, equivalently, a low resistance) is sent to the motor, typically a short circuit. The resistances are generally applied in parallel to the electrical terminals on the motor. The duty cycle, or relative lengths of the low-load and high-load portions, is determined in response to the machine deceleration rate 32, by a converter. For instance, the more the brake pedal 22 is depressed, the longer the high-load portion, and the shorter the low-load portion. It is found that PWM of the load across the motor may be more effective as a braking tool than plug braking, in that the motor may stop more quickly, thereby reducing the stopping distance of the vehicle and increasing safety.

Other possible braking rate controls 35 include pulse-position modulation (PPM), as well as use of a generally pulsed or non-pulsed analog or digital signal. Note that in any of the possible braking rate controls 35, the operator controls the rate of braking, preferably by varying the position of the brake pedal 22. This may be referred to as variable dynamic braking, and may be contrasted with the fixed dynamic braking described above, in which the operator has no control over the rate of braking. Note that dynamic braking may include as few as one discrete rate, corresponding to a pedal condition of "engaged", in addition to the rate corresponding to "disengaged".

During braking, as the vehicle's velocity drops below a certain threshold, the braking command 27 infers that the operator intends to stop the vehicle and automatically engages a parking brake 30. The parking brake 30 may be in the form of a spring loaded mechanical brake 33, typically engaged by stopping the current through a solenoid in the brake mechanism. When the current stops, a spring loaded caliper brake pad is engaged. Use of the parking brake at these low velocities ensures that the vehicle may be safely parked on an incline, for example, without fear of drifting. In addition, when the vehicle is restarted from a stationary position, the parking brake 30 may be electronically disengaged, reducing the possibility of damage caused by driving with the parking brake 30 engaged.

The safety system 28 may employ an emergency brake 29 if it detects a malfunction anywhere in the system. The emergency brake 29 typically may use the same spring loaded mechanical brake 33 as the parking brake. For instance, if the power is cut off, the current to the solenoid is stopped, and the spring loaded mechanical brake 33 is engaged. If an electrical defect is found in any of the signals, say the pulses are interrupted, then the default safety response is to engage the emergency brake 29, which is the spring loaded mechanical brake 33. This safety response is an improvement over a conventional mechanical braking system that uses a cable, in that in the event of a failure, the brake is engaged and the vehicle is brought to a halt.

Figure 4:
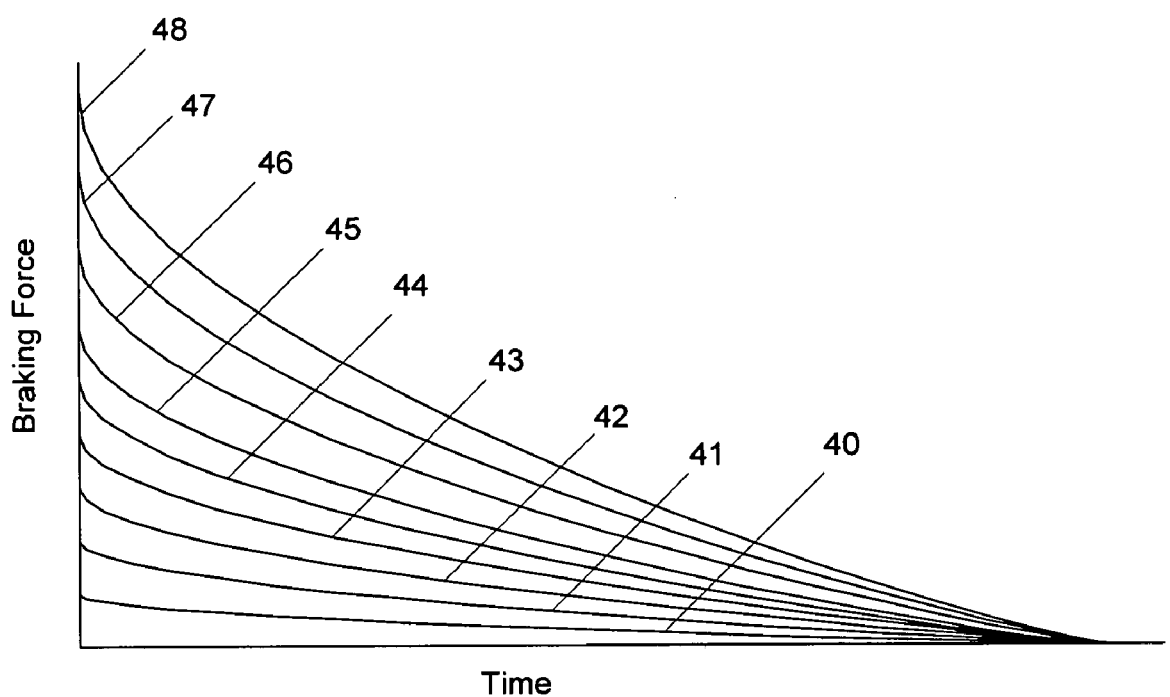
FIG. 4 is a plot of braking force versus time for various brake pedal positions.

It is desirable that the operator feel a particular level of comfort applying the brake, comparable with the familiar feel of a cabled mechanical brake system found in other vehicles. Preferably, the brake should approximate the sensation of a common mechanical brake system. Because of the electronic nature of the braking system, the machine deceleration rate 32 may be tuned to mimic or proximate the feel of the cabled system. FIG. 4 shows an exemplary tuning scheme, in which the braking force is plotted against time, for nine different brake pedal positions. The case of the brake pedal completely released is denoted by item 40, items 41-47 represent increasingly depressed brake pedal positions, and item 48 denotes a fully depressed brake pedal. The set of curves shown in FIG. 4 may be adjusted as needed to increase the comfort level of the operator while suitably slowing down the vehicle. Note that the curves are determined by the machine deceleration rate 32 of FIG. 3.

Figure 5:
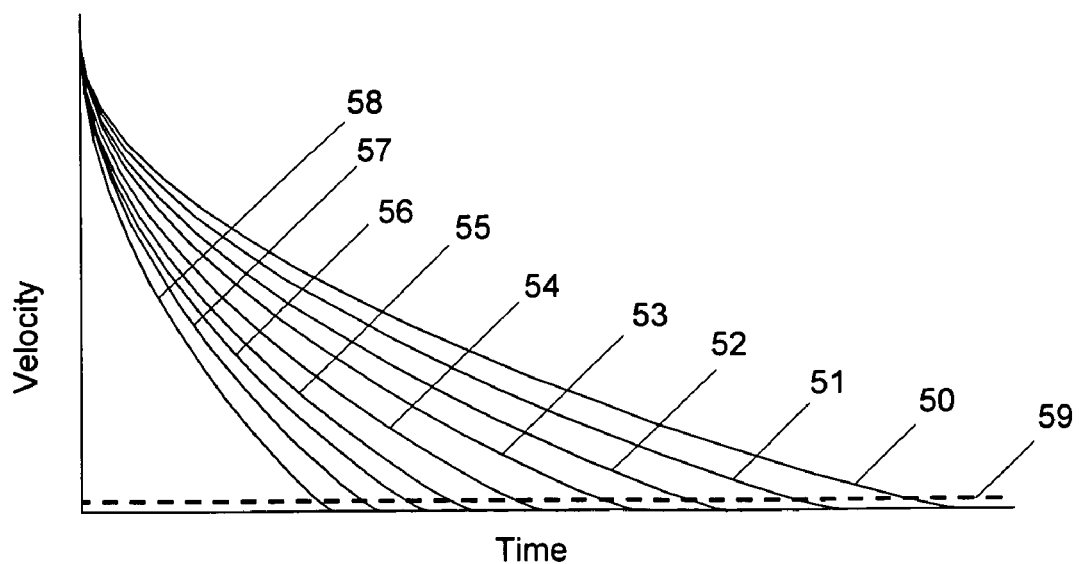
FIG. 5 is a plot of velocity versus time for various brake pedal positions, including a threshold velocity.

Similarly, FIG. 5 shows an exemplary plot of velocity against time, for nine different brake pedal positions 50-58. The brake pedal is completely released for 50, and completely depressed for 58. These curves are directly related to those in FIG. 4, because the braking force is proportional to the time derivative of velocity. The threshold velocity 59 is shown as a dotted line in FIG. 5, at which the parking brake 30 is engaged during stopping. Note that the curves in FIG. 5 are also determined by the machine deceleration rate 32 of FIG. 3.

The sensing of the velocity and pedal position, along with the determination of the braking rate, may be repeated at regular or irregular intervals, by an updater. Preferably, the updater operates at a frequency greater than the response frequency of the motor so that the stopping motion is smooth and the user in unaware of the rapid updating of the braking function in response to velocity.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A method of providing an electrical braking function through an electrical motor in a surface maintenance vehicle to approximate the feel of a mechanical braking system, comprising the steps of:
    a. engaging a brake pedal to initiate braking function;
    b. sensing the position of the brake pedal and encoding the pedal position as an electronic signal;
    c. sensing the vehicle velocity;
    d. using said vehicle velocity and said signal, determining a desired machine deceleration rate to approximate the sensation of mechanical braking;
    e. determining the desired conductance applied in parallel to the motor to create a dynamic braking force from the motor;
    f. generating a series of pulses of frequency at least as great as the response frequency of the motor and creating an effective conductance;
    g. applying the effective conductance in parallel with the motor to cause machine deceleration by dynamic braking, and
    h. re-adjusting the conductance in response to deceleration to proximate the feel of mechanical braking, whereby the vehicle is decelerated.

2. A method of providing an electrical braking function through an electrical motor in a surface maintenance vehicle to proximate the feel of a mechanical braking system, comprising the steps of:
    a. engaging a brake pedal to initiate braking function;
    b. sensing the position of the brake pedal and encoding the pedal position as an electronic signal;
    c. sensing the vehicle velocity;
    d. using said vehicle velocity and said signal, determining a desired machine deceleration rate to approximate the sensation of mechanical braking;
    e. generating a series of pulses of frequency greater than the response frequency of the motor;
    f. within each pulse defining the desired duty cycle to create an effective conductance;
    g. applying the effective conductance in parallel with the motor to cause machine deceleration by dynamic braking; and
    h. iteratively checking vehicle velocity and brake pedal position and correspondingly altering duty cycle to respond to demand for greater or lesser braking.

3. The method of claim 2, wherein the determining step is performed by calculation.

4. The method of claim 2, wherein the determining step is performed by lookup table.

5. The method of claim 2, wherein the determining step is performed by a combination of calculation and lookup table.

6. The method of claim 2, wherein the amplitude of each pulse is essentially constant and does not vary with duty cycle.

7. The method of claim 6, wherein if the sensed vehicle velocity is below a predetermined threshold velocity, then a parking brake is engaged.

8. The method of claim 7, wherein the parking brake is a solenoid-driven spring-loaded caliper brake pad.

9. An electrically powered surface maintenance machine with dynamic braking capable of proximating mechanical braking response, comprising:
    a. an electric motor;
    b. a brake pedal having a position sensor;
    c. an encoder for converting the pedal position to an electrical pedal position signal;
    d. a machine velocity sensor;
    e. a braking rate controller capable of determining braking force tuned to approximate mechanical braking, in response to the electrical pedal position signal and the machine velocity;
    f. a converter to translate braking rate to an effective electrical load to be applied in parallel to the motor;
    g. an updater for iteratively checking the machine velocity and the pedal position and repeatedly adjusting the braking rate and thereby adjusting the effective electrical load applied in parallel to the motor; and
    wherein the effective electrical load is determined by a series of pulses of frequency greater than the response frequency of the motor.

10. The machine of claim 9, wherein the effective electrical load is determined by the duty cycles of the pulses.

11. The machine of claim 10, wherein the amplitude of the pulses is essentially constant and independent of the duty cycle.

12. The machine of claim 9, wherein if the sensed machine velocity is below a predetermined threshold velocity, then a parking brake is engaged.

13. The machine of claim 12, wherein the parking brake is a solenoid-driven spring-loaded caliper brake pad.

* * * * *